(12) United States Patent
Schwartz et al.

(10) Patent No.: US 12,399,107 B1
(45) Date of Patent: Aug. 26, 2025

(54) INTEGRATED SPECTROSCOPIC SYSTEM WITH CUVETTE HOLDERS AND HOMOGENIZED ILLUMINATION

(71) Applicant: Center for Quantitative Cytometry, San Juan, PR (US)

(72) Inventors: Abraham Schwartz, San Juan, PR (US); Philip Sherman, Cleveland, OH (US)

(73) Assignee: Center for Quantitative Cytometry, San Juan, PR (US)

( * ) Notice: Subject to any disclaimer, the term of this patent is extended or adjusted under 35 U.S.C. 154(b) by 0 days.

(21) Appl. No.: 19/067,531

(22) Filed: Feb. 28, 2025

(51) Int. Cl.
*G01N 21/01* (2006.01)
*G01N 21/25* (2006.01)

(52) U.S. Cl.
CPC ........... *G01N 21/01* (2013.01); *G01N 21/255* (2013.01); *G01N 2201/062* (2013.01); *G01N 2201/065* (2013.01)

(58) Field of Classification Search
CPC .............. G01N 21/01; G01N 21/255; G01N 2201/062; G01N 2201/065
See application file for complete search history.

(56) References Cited

U.S. PATENT DOCUMENTS

| | | | |
|---|---|---|---|
| 9,435,687 B1 | 9/2016 | Schwartz et al. | |
| 9,513,224 B2* | 12/2016 | Mohan | G02B 21/125 |
| 2016/0131524 A1* | 5/2016 | Arenhold | G01J 3/524 |
| | | | 356/405 |
| 2020/0041405 A1* | 2/2020 | Stevenson | G01J 3/10 |
| 2021/0080370 A1* | 3/2021 | Karnutsch | H01S 5/4087 |
| 2024/0210425 A1* | 6/2024 | Nishi | B01L 3/502715 |

OTHER PUBLICATIONS

Fantoni, M. Fernandes, J. Fidalgo, K. Soto, S. A. Pereira, A. Moreno, C. Domingos, A. Correia, H. Sousa, C. Serafinelli, M. Vieira, "The LUMINA setup for a light-based urine monitoring and analysis," Proc. SPIE 13008, Biophotonics in Point-of-Care III, 130080H (Jun. 20, 2024) (Year: 2024).*

* cited by examiner

*Primary Examiner* — Tarifur R Chowdhury
*Assistant Examiner* — Carlos Perez-Guzman
(74) *Attorney, Agent, or Firm* — Patenting Consulting Group; Roberto J Rios

(57) ABSTRACT

A spectroscopic system is provided for light homogenization and spectral analysis. The system includes an illumination using LEDs mounted on an integrating sphere to homogenize input light for consistent illumination profiles across broad wavelength ranges. Reference and sample cuvette holders are optically coupled to the illumination sphere. Light transmitted through the cuvettes enters respective reference and sample integrating spheres where is homogenized and emitted as uniform output light. The cuvette holders have a side opening for side-mounted illumination sources. A reflective background surface can also be provided to reflect light from the side-mounted illumination source into the integrating spheres. A diffraction grating and an imaging capture device resolve and record spectral data. A processor is provided to control illumination parameters (intensity, wavelength), slit adjustment, image capture, and data processing, enabling data analysis. The components are integrally formed as a single unit for compactness and efficiency.

25 Claims, 21 Drawing Sheets

- PRIOR ART -

# INTEGRATED SPECTROSCOPIC SYSTEM WITH CUVETTE HOLDERS AND HOMOGENIZED ILLUMINATION

FIELD OF THE INVENTION

The present invention relates to the field of spectroscopic analysis systems, particularly those designed for light homogenization and spectral measurement across broad wavelength ranges. Specifically, this invention pertains to compact, integrated spectroscopic devices used in applications such as chemical analysis, biomedical research, and environmental monitoring.

BACKGROUND OF THE INVENTION

In the evolution of spectroscopic analysis, the precision and versatility of measurement systems have become crucial for a wide range of applications spanning from medical diagnostics to environmental monitoring. Spectroscopy involves measuring a material's absorption of electromagnetic energy and the resulting spectral energies to determine its chemical composition. Therefore, a spectrometer requires an illumination source whose wavelength energy can be absorbed by the materials of interest.

Traditional spectroscopic devices often encounter limitations due to uneven sample illumination and fixed spectral resolution, which can impair the accuracy and precision of the analysis. Specifically, traditional spectrometers, such as the one shows in FIG. 1, employ a monochromator that receives light from an illumination source and diffracts a wide wavelength range light source. This is carried out by rotating the monochromator, so that slices of the diffracted light are directed through an aperture to sequentially scan the sample with progressive wavelengths of light. A detector measures and records the intensities of the illumination after it passes through the sample and is presented as an absorption spectrum across the wavelengths of the illumination. This method works best when the absorption properties of the samples are already known, allowing for the selection of a narrow illumination wavelength to maximize signal intensity. However, it suffers from the limitation that the full wavelength range does not illuminate the sample simultaneously, and the components require moving parts and manual alignment, increasing the risk of misalignment.

For survey applications where the sample's absorption properties are unknown, a wide wavelength range of illumination is preferable to reveal the complete absorption profile across the illumination wavelength range. Early systems used white light from sources like mercury, tungsten, or halogen lamps, directed through optical filters or scanned across a wide wavelength range to select the desired narrow band to illuminate the samples. Laser beams, offering very narrow wavelength bands, have since replaced these light sources, but these illumination configurations are fixed and might need multiple lasers of different wavelengths to cover the sample's absorption wavelength range.

Consequently, there is a necessity for innovations that provide uniform illumination across samples to minimize measurement errors caused by intensity variations. Furthermore, the ability to adjust spectral resolution is essential in accommodating diverse analytical requirements, where higher resolutions are beneficial for detecting fine features within a spectrum, while lower resolutions may suffice for broader spectral surveys or when faster analysis times are needed. An integrated spectroscopic system that overcomes these challenges by seamlessly combining homogenized illumination with adjustable spectral profile would represent a significant advancement in the field, enhancing both the reliability and adaptability of spectroscopic measurements.

SUMMARY OF THE INVENTION

The spectroscopic system of the invention employs integrating chambers to obtain optically uniform spectral beams. This uniformity is accomplished by directing an energy beam into a hollow chamber with a spectrally high reflective inner surface. The reflective surface causes the beam to reflect multiple times within the chamber at different angles before it exits the integrating chamber as a highly uniform energy beam exhibiting high uniformity in both its spatial distribution and angular dispersion. This process homogenizes the light distribution within the chamber, effectively averaging out spatial variations and producing a uniform light field. This means that the radiance (intensity per unit area) is consistent across the entire exit aperture of the integrating chamber, and the emitted light maintains a uniform intensity across the plane of the exit. As a result, the light exiting is highly uniform, regardless of the input beams' original directions or intensities.

According to an embodiment, the present invention provides a novel physical optical system comprised of integrating chambers in the form of spheres, LEDs of specific wavelength ranges, and reference and sample cuvette holders mounted in between the illumination integrating spheres and the reference and sample integrating spheres, respectively.

According to another embodiment, the wavelength range and spectral profile shape of the illumination impinging of the sample can be adjusted from UV to IR by mixing and controlling the intensity of the outputs of selected LEDs. The flexibility and uniformity of the spectral illumination profile arises from combining inputs of selected LEDs in an integrating sphere and outputting the resulting illumination through a portal. In a preferred embodiment, the portal is a slit.

Since the intensity output of LEDs is not spherically uniform, the strongest intensity is in the form of a cone emitting from the tip of the LED with weaker radiation from the sides. Integrating spheres reflect a beam of light multiple times within its curved reflective surface of the sphere before it exists the sphere. In this manner, integrating spheres output of light beams are uniform in terms of intensity and spectra for illumination and diffraction.

According to still another embodiment, the spectroscopic system of the invention applies the homogeneity of light provided by integrating spheres to Intrinsic spectroscopy where the processing is conducted on the whole illumination range in one step to provide both the absorption profile and the reflection and emission components all in the same spectrum.

According to an embodiment, the present invention provides a flexible and uniform spectral illumination profile using integrating spheres and LEDs. Integrating spheres are used to obtain optically uniform spectral beams by reflecting an energy beam multiple times within a hollow sphere with a highly reflective inner surface. This ensures that the light exiting the sphere is highly uniform in both intensity and spectra.

According to another embodiment, the invention uses integrating spheres, LEDs of specific wavelength ranges, and cuvette holders for reference and sample materials. By mixing and controlling the intensity of selected LEDs, the wavelength range and spectral profile shape of the illumination impinging on the sample can be adjusted from UV to IR. This contrasts with traditional systems that rely on fixed light sources or scanning mechanisms. Unlike classic spectrometers that use monochromatic light sources and adjustable apertures, the present invention uses an integrating sphere with multiple LEDs to create a tunable and homogenous illumination source. This design allows for generating a wide range of custom illumination profiles.

According to yet another embodiment, the present invention employs Intrinsic Spectroscopy, processing the entire illumination range in one step to obtain absorption, reflection, and emission spectra. This contrasts with classic spectrometers that use a selected narrow wavelength band as the illumination source.

According to an embodiment, the spectroscopic system of the invention functions in a reflection mode using additional LEDs and a reflecting background.

According to another embodiment, the spectroscopic system of the invention is a single, pre-aligned optical unit ensuring accurate and fixed alignment of the system's components. This contrasts with prior art systems that may require manual alignment and are more susceptible to loss of misalignment.

According to still another embodiment, the spectroscopic system of the invention is formed as a single physical, pre-aligned optical unit made through 3D printing to ensure that the alignment of the system's components is accurate and fixed.

According to yet another embodiment, the accuracy of data obtained from spectroscopic examinations is improved with the system of the invention equipped with the illumination arrangement to create specific illumination profiles and the integrating spheres that ensure light homogenization. This configuration effectively reduces or eradicates inconsistencies in beam intensity that could stem from irregularities in beam profiles, like intense spots or other disparities common in unconditioned beams.

According to another embodiment, the spectroscopic system of the invention ensures equivalent conditions of exposure through the incorporation of integrating spheres prior to the samples and references undergoing illumination. This balance in exposure is crucial in forming precise evaluations of the intrinsic characteristics of the sample being analyzed when juxtaposed with established standards or references housed within their individual cuvettes. The uniform distribution of emission from each of the integrating spheres contributes directly to enhanced consistency and dependability of spectroscopic measurements acquired in the following detection phases of the system.

According to still another embodiment, the full spectrum of the illumination source impinges on the sample before being diffracted and processed. This is an important aspect of the invention, which differs from the spectrometers from the prior art that first diffracts light from the illumination source and then directs the diffracted light into the sample for further detection and processing.

According to yet another embodiment, in the case of intrinsic spectrometers, once the system is balanced, the spectroscopic system of the invention passes the full wavelength range of the illumination through the empty reference cuvette and the sample cuvette and then directed to a diffraction grading so that digital images are obtained. The system is balanced when the spectrum of the reference spectrum is subtracted from the sample spectrum and no spectral components are present in the spectrum. Then, when a sample is present in the sample cuvette, only spectral components appear in the resulting spectrum referred to as the Intrinsic spectrum of the sample.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

The optical design of the invention produces homogeneous electromagnetic energy beams via an illumination chamber that produces a flexible homogeneous source of an illumination wavelength range. An empty reference cuvette, a sample cuvette housing a material of interest, and respective reference and sample integrating chambers are provided to project and direct homogeneous beams of energy derived from the materials of interest after absorbing the illumination energy for further analysis.

Figure 1:
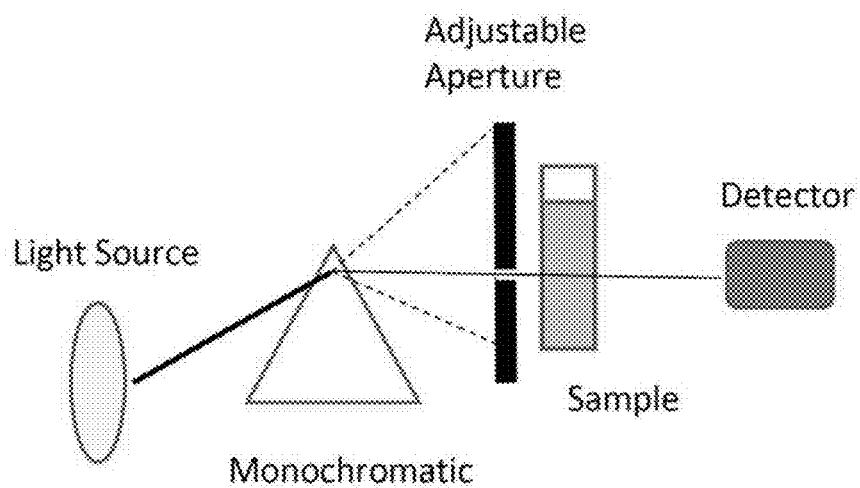
FIG. 1 illustrates a spectrometer of the prior art.
Figure 2:
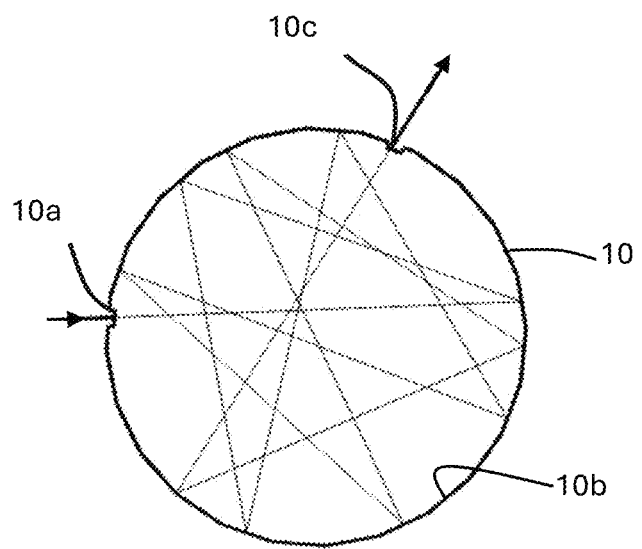
FIG. 2 illustrates an integrating sphere where light enters and undergoes multiple internal reflections before exiting the sphere as a homogeneous energy, according to the present invention.

While the integrating chambers can have various shapes, such as but not limited to a cubic or a cylindrical shape, a spherical integrating sphere will be used throughout the rest of the description to explain the novel concepts of the invention. An integrating sphere, as shown in FIG. 2, is a key element within the spectroscopic system aimed at improving the evenness of illumination provided by the illumination source. This sphere features an illumination port 10a, where light from the illumination source is introduced. The sphere's interior is coated with an inner reflective surface 10b, which is designed to scatter incoming illumination to ensure that a consistent and homogenized emission is discharged. The resultant even illumination departs the integrating sphere through an output port 10c, which then directs the homogenized illumination towards the cuvettes situated in their respective holders for spectroscopic examination and analysis of a sample. Specifically, the integrating sphere uses its highly reflective inner surface to scatter light through countless diffuse reflections, transforming uneven or directional input light into uniform output light. When light enters the sphere, it bounces randomly off the reflective surface spreading evenly across the interior. These repeated reflections erase irregularities in the light's spatial distribution, angle, or intensity, ensuring that the output light exiting through the output port 10c is homogeneous, and consistent in brightness and direction. This uniformity allows precise measurements, as the output accurately represents the total light input, free from distortions of the original light source's shape, hotspots, or angular bias. The sphere's design ensures that the output's quality depends directly on the efficiency of these inner reflections.

Figure 3:
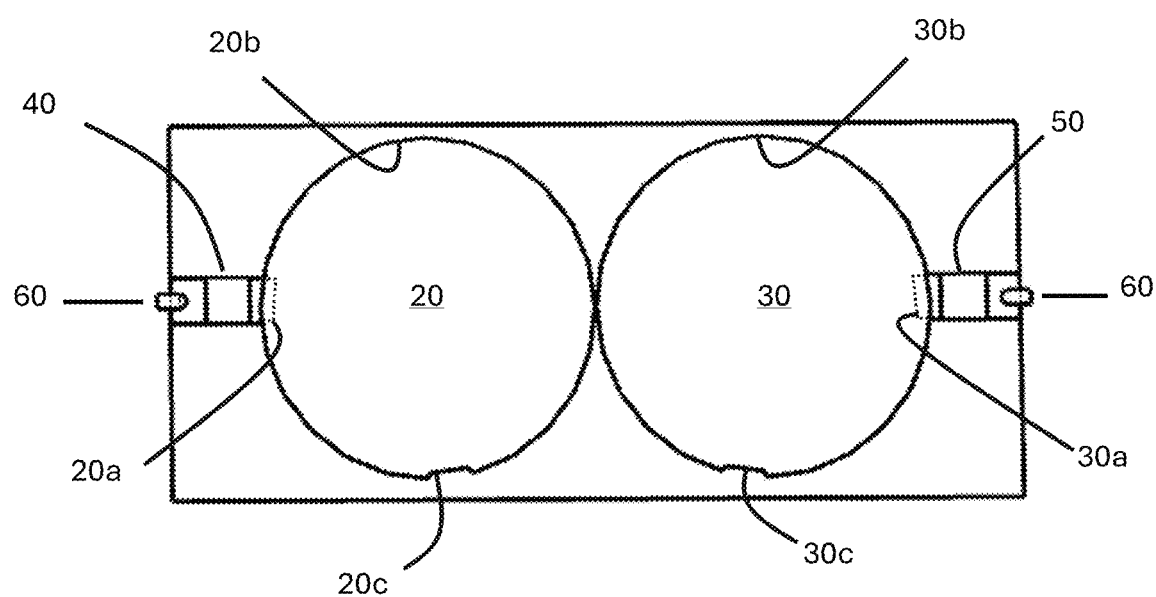
FIG. 3 shows an optical system consisting of two integrating spheres and the cuvette chambers illuminated with individual LEDs, according to the invention.

According to an embodiment of the invention shown in FIG. 3, individual illumination sources 60 are directly coupled to a side port of the reference cuvette holder 50 and the sample cuvette holder 40 and the spectroscopic system includes a reference integrating sphere 30 optically coupled to a reference cuvette holder 50 via an input port 30a and a sample integrating sphere 20 optically coupled to a sample cuvette holder 40 via an input port 20a. The individual illumination sources 60 are directed into the reference cuvette holder 50 and the sample cuvette holder 40, preferably at a 90-degree angle from the exit of said cuvette holders directing the lights from the reference and sample cuvette holders into respective reference and sample integrating spheres, so that the light is homogenized and outputted through output slits onto a diffraction grating 70. As will be explained in conjunction with FIG. 16, this configuration can also serve as a reflecting spectrometer that can be used for regular or intrinsic spectroscopy.

Figure 4:
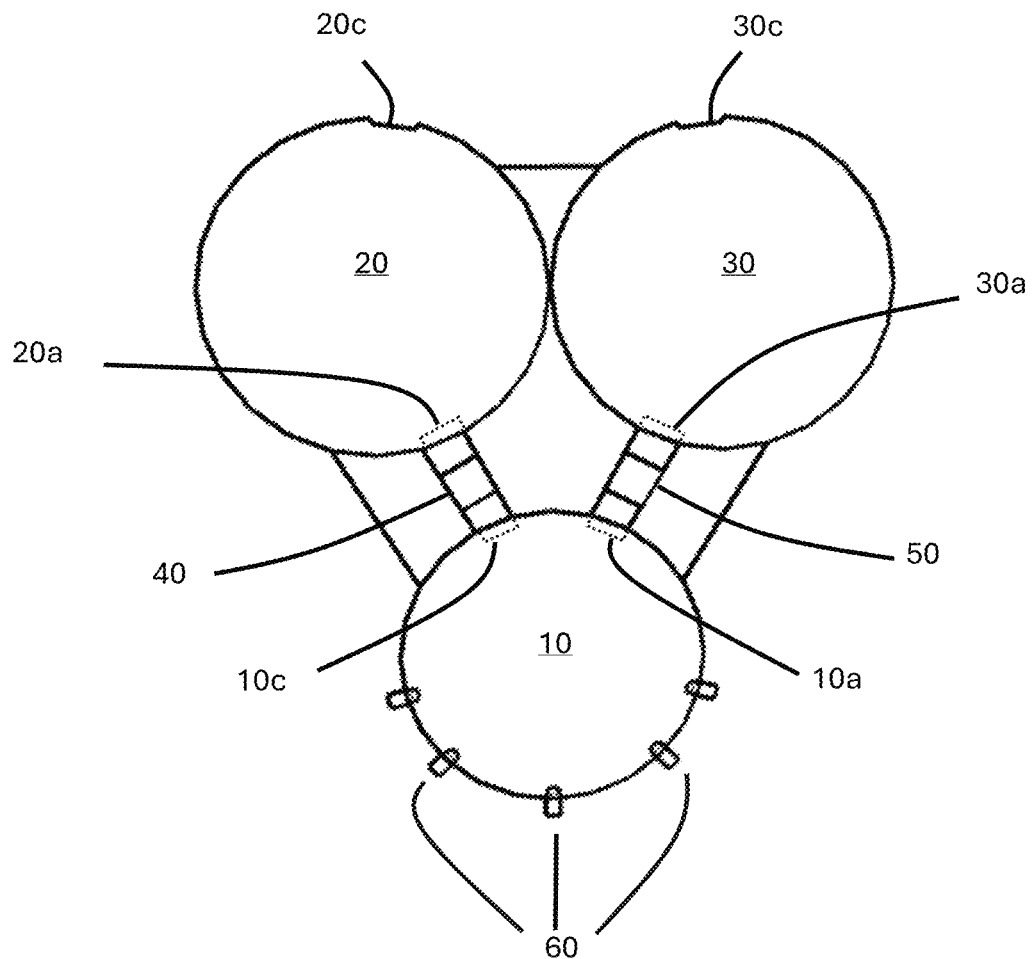
FIG. 4 shows an optical system consisting of three integrating spheres illuminated with LEDs mounted in a single sphere and directed through cuvette chambers containing cuvettes then into separate reference and sample integrating spheres, according to the invention.
Figure 5:
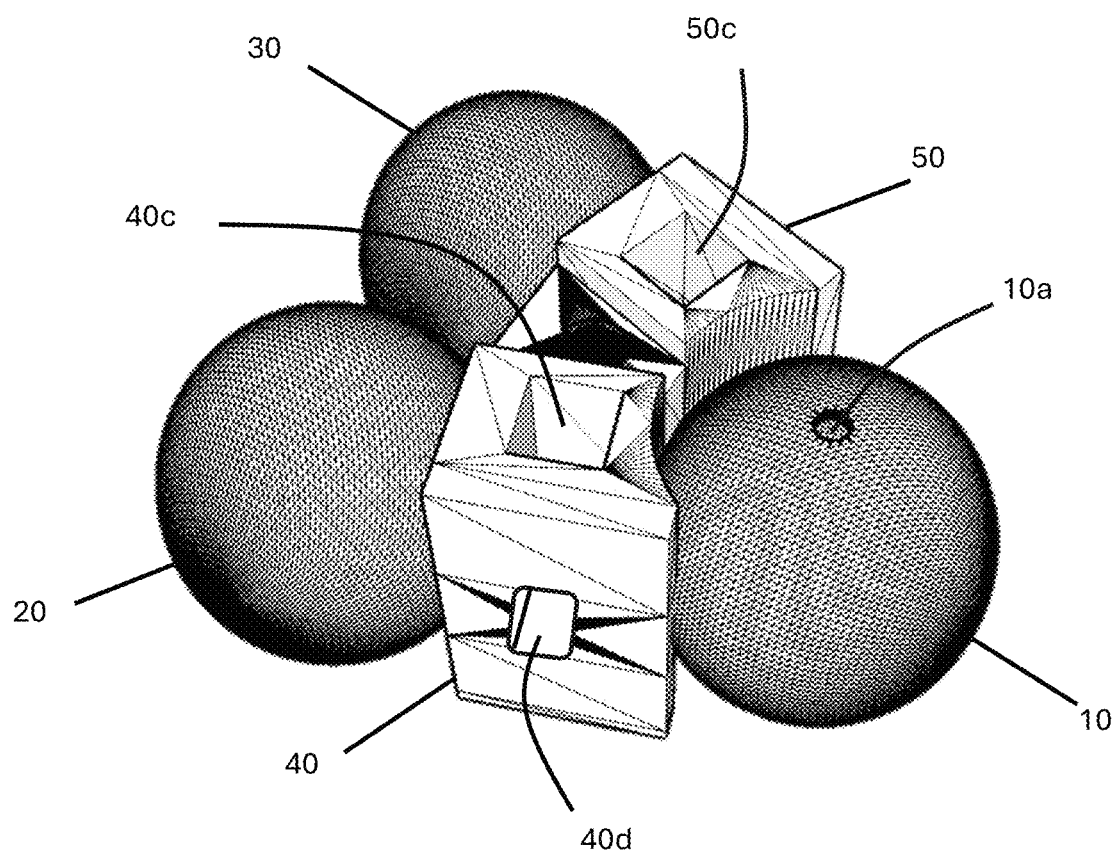
FIG. 5 shows a top perspective view of the spectroscopic system with three illumination spheres and the cuvette holders, according to the invention.
Figure 6:
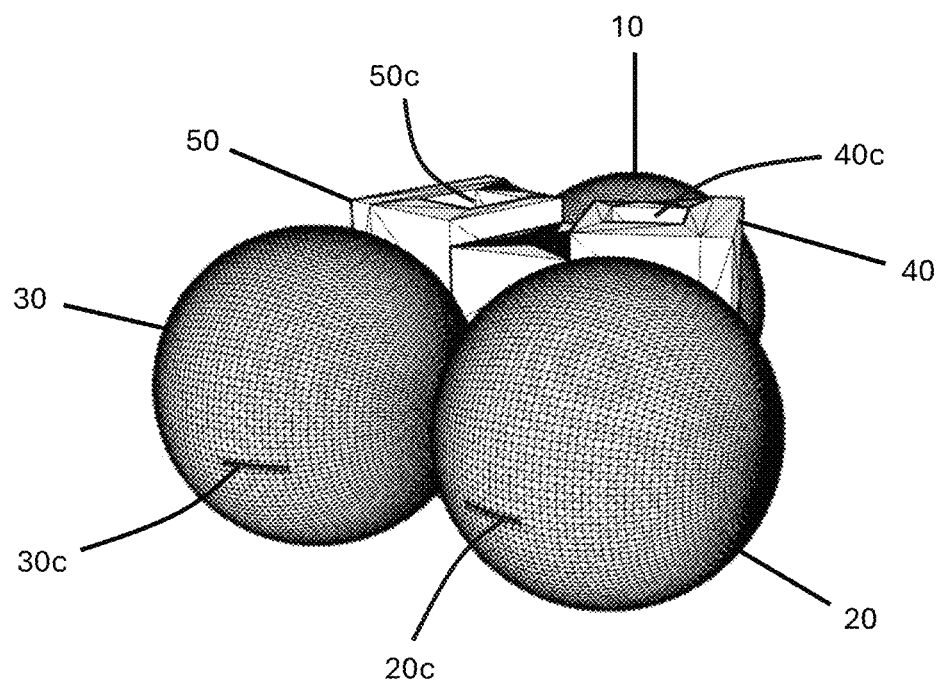
FIG. 6 shows another view of the spectroscopic system with three illumination spheres and the cuvette holders, according to the invention.
Figure 7:
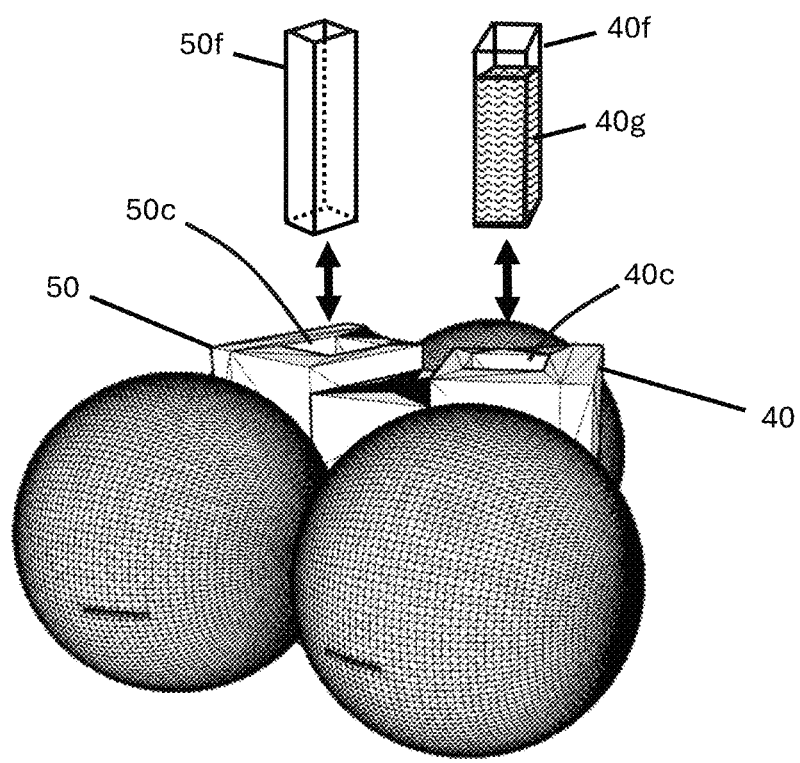
FIG. 7 shows another view of the spectroscopic system with three illumination spheres, the cuvette holders and the cuvettes, according to the invention.
Figure 8:
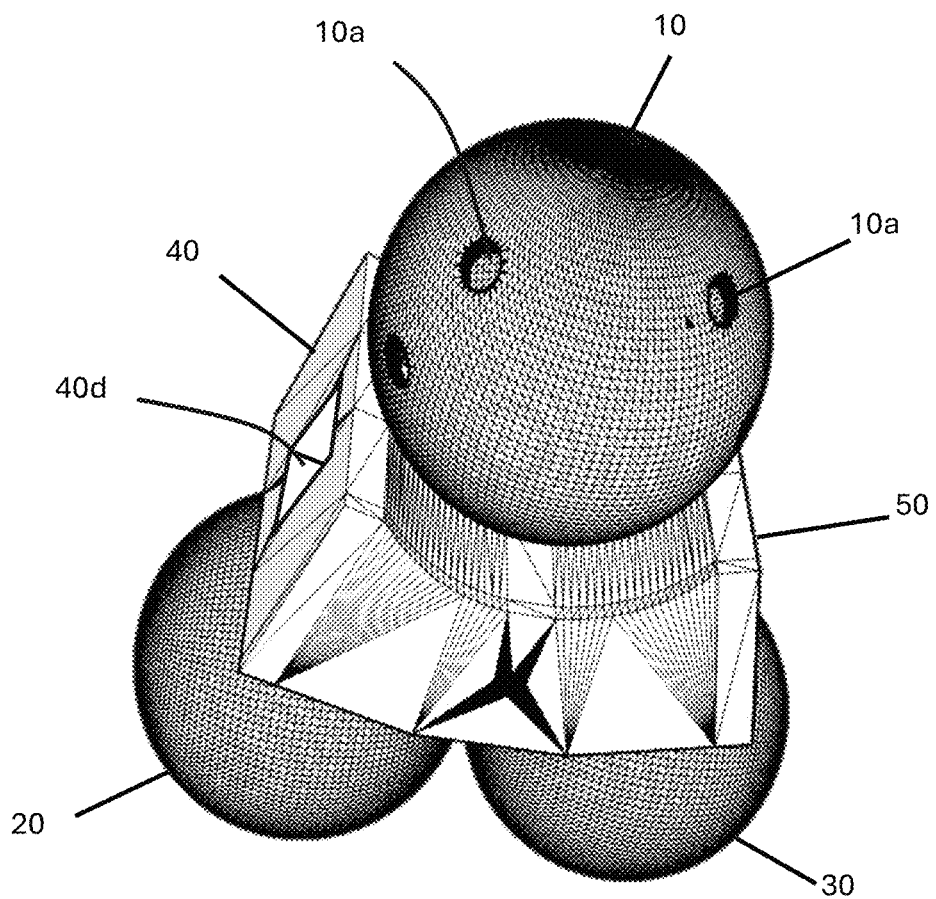
FIG. 8 shows a top perspective view of the spectroscopic system with three illumination spheres and the cuvette holders, according to the invention.

This arrangement can be used in situations where only a single illumination source having a specific wavelength range is needed for spectroscopic examination and analysis of the sample. As will be explained later, a similar effect can be achieved by coupling at least one illumination source 60 to an illumination integrating sphere 10 that is optically coupled to both the reference cuvette holder 50 and the sample cuvette holder 40, as shown in FIG. 4.

Both, the sample integrating sphere 20 and the reference integrating sphere 30, have an inner reflective surfaces 20b and 30b, respectively, that serve to homogenize the beam of light entering through their respective input ports 20a and 30a and exiting through their respective output slits 20c and 30c. By ensuring that the radiant energy received from the cuvettes is uniformly distributed, the system diminishes variances that could potentially impact spectral measurements. The spectral resolution of light exiting the output slits of the reference and sample integrating spheres can be adjusted by modulating the height of the output slits, the width of the output slits, or a combination thereof, which act as a spatial filter. A narrower width of the slit restricts the angular spread of the homogenized light exiting the sphere, producing a more collimated beam. This reduces the overlap of adjacent wavelengths when the light is later dispersed by a diffraction grating, thereby improving spectral resolution. Conversely, a narrower height of the slit produces a sharper beam of light, increases the wavelength resolution of the light dispersed by a diffraction grating, thereby improving spectral detail. After exiting the output slits, the homogenized light is directed to a diffraction grating 70, which spatially separates wavelengths. A narrower slit produces a sharper input beam to the grating, enabling finer distinction between closely spaced spectral lines. Adjusting the slit width thus directly controls the linewidth of spectral peaks detected by the imaging capture device 80 (e.g., a CCD camera).

In an embodiment of the invention, in addition to providing the output slits of the integrating spheres with a predefined height and width, the slit width can also be mechanically adjusted (e.g., via motorized actuators) or manually tuned. This adjustment can be coupled with a processor to optimize resolution dynamically based on application needs. For example: in UV-Vis spectroscopy, a narrower slit might be used to resolve fine absorption bands, while in low-light scenarios (e.g., IR or fluorescence), a wider slit boosts signal-to-noise ratio at the cost of resolution.

Figure 21:
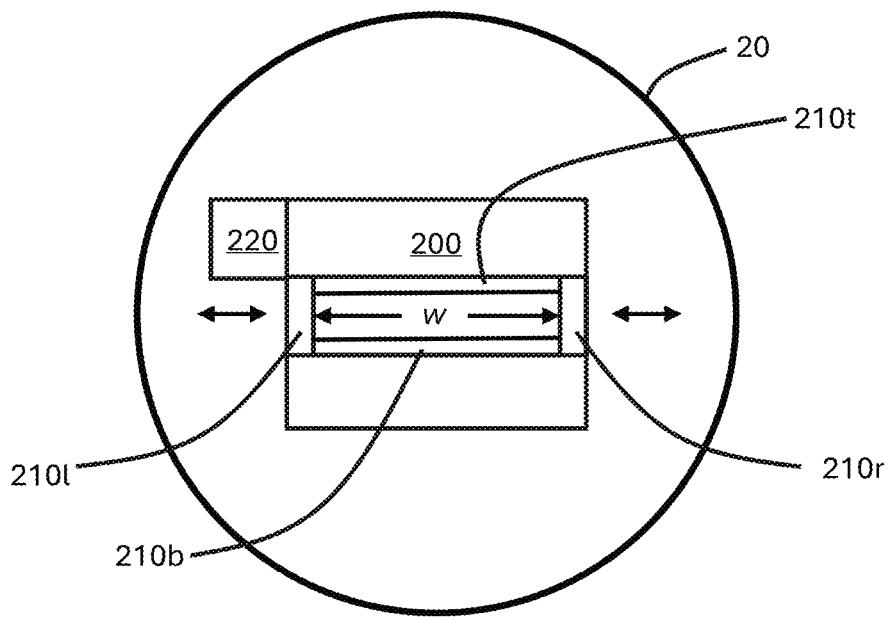
FIG. 21 illustrates an integrating sphere with an adjustable output slit, where the height of the slit is changed, according to the invention.
Figure 22:
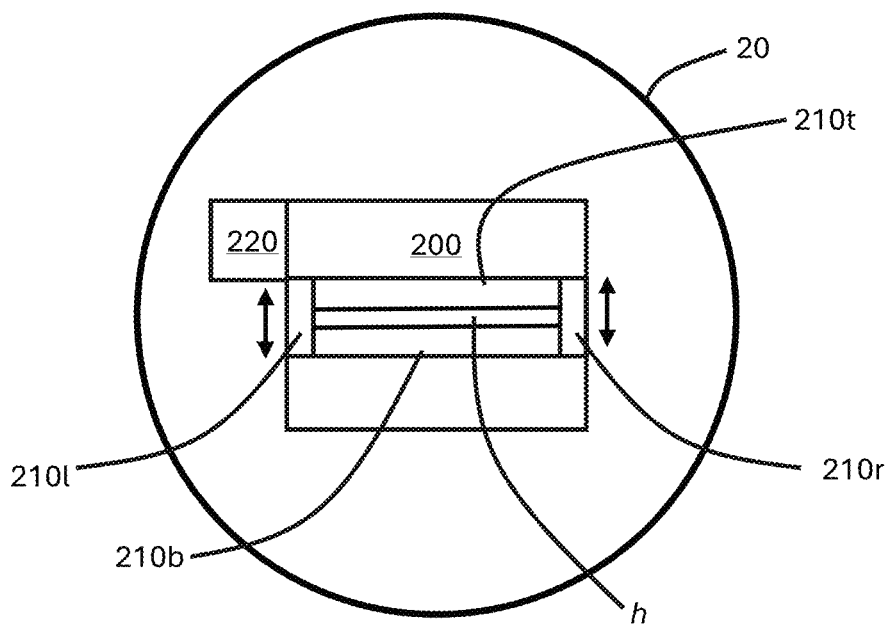
FIG. 22 illustrates an integrating sphere with an adjustable output slit, where the width of the slit is changed, according to the invention.

FIGS. 21 and 22 illustrates an exemplary embodiment of the adjustable slit feature where an integrating sphere (20) is provided with an adjustable slit (200) comprising adjustable panes (210$t$, 210$b$, 210$l$, 210$r$). These adjustable panes are controlled by an adjust mechanism (220) that moves them either closer together or further apart to modify the height (h) and width (w) of the slit. This configuration allows for precise control over the amount of light exiting the integrating sphere, making the system adaptable for different applications requiring variable light output. In operation, the system operates to at least one of increase or decrease the slit height, to increase or decrease the slit width, or combinations thereof. In FIG. 21, the adjust mechanism (220) moves the lateral adjustable panes (210l, 210r) away from each other or close to each other to increase or decrease the width (w) of the slit, respectively, and allowing more or less light to pass through. Conversely, in FIG. 22, the adjust mechanism (220) moves the top and bottom adjustable panes (210t, 210b) away from each other or close to each other, increasing or reducing the height (h) of the slit, respectively, and selectively restricting the amount of light that exits. The adjust mechanism (220) can be designed to operate either manually or automatically, depending on the application. For manual operation, several mechanisms can be implemented. A rotary knob and screw mechanism allows users to turn a knob that drives a threaded rod, moving the adjustable panes (210t, 210b) and/or (210l, 210r) symmetrically. Alternatively, a rack and pinion system can be used, where a lever engages with a gear system to slide the panes into the desired position. Another option is a sliding rail system, where the panes move along a set of linear rails and are locked in place using a mechanical latch. For automated operation, different motorized and electromechanical components can be utilized. A stepper motor with a lead screw can provide precise movement of the panes based on electronic control inputs provided by a processor 90. Similarly, linear actuators can be employed to push or pull the panes to achieve the desired slit height and width. A solenoid-based system can also be used to engage a linkage that moves the panes to predefined positions. For applications requiring micro-adjustments, piezoelectric actuators can be integrated to provide fine-tuned control over the slit dimensions.

According to a preferred embodiment of the invention, FIG. 4 shows a spectroscopic system that incorporates an illumination integrating sphere including an illumination source arrangement. A plurality of input ports are provided throughout the outer surface of the illumination integrating sphere 10, which are configured to receive each an illumination source 60. For the purpose of the specification, the terms illumination source and LED will be used interchangeably throughout the description. However, it is to be understood that equivalent light sources can also be used. One key aspect of the invention is its flexibility in the types and numbers of LEDs that are mounted in the illumination integrating sphere that can be controlled by a processor 90 to create custom illumination profiles. Particular operational characteristics of the illumination source, such as the wavelength of the LEDs, their luminance, or even their distribution over the surface of the illumination integrating sphere, are selected and controlled to accomplish a uniformed output emission with an ideal desired illumination profile as it emerges through the respective output slits. This LEDs arrangement provides the spectroscopic system of the invention with the capability to emit white, UV (ultraviolet), blue, green, red, or IR (infrared) emissions. This variety in LED types endow the system with a flexible approach to meet various analytical challenges. For example, white LEDs are suitable for a wide range of applications; UV LEDs can be utilized in fluorescence analysis; blue or green LEDs are appropriate for distinct absorbance evaluations; red LEDs can help minimize photobleaching effects; and IR LEDs enhance transmittance assessments in specific samples.

A spectroscopic system according to a preferred embodiment of the invention will be explained in conjunction with FIGS. 4-18. The spectroscopic system includes an illumination integrating sphere 10 including at least one illumination port 10a configured to receive an LED 60 and two output ports 10c optically coupled to the reference cuvette holder 50 and the sample cuvette holder 40, respectively. The sample cuvette holder 40 and the reference cuvette holder 50 are situated in close proximity to each other and optically coupled to the sample integrating sphere 20 and the reference integrating sphere 30, respectively, as shown in FIGS. 4-9. The sample cuvette holder 40 is configured to house a sample cuvette 40f containing a sample 40g, while the reference cuvette holder 50 is configured to house an unfilled cuvette 50f which acts as a reference point or standard for comparative assessment with the sample during spectral data collection.

Figure 16:
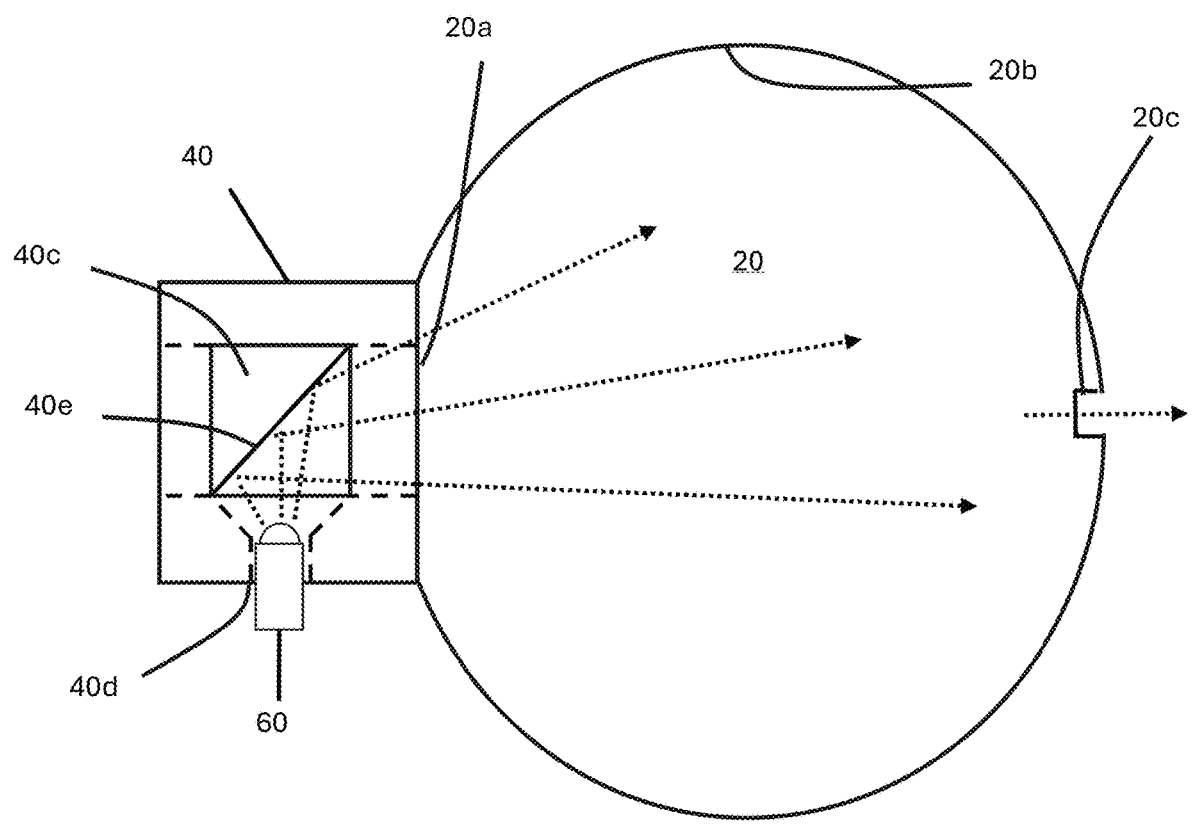
FIG. 16 illustrates the reflection mode of the spectroscopic system, where illuminations sources are mounted on the sides of the cuvette holders and a reflective background surface, according to the invention.

The cuvettes (40f, 50f) are manufactured from materials that are chosen for their optical transparency in specific wavelength ranges, chemical compatibility, durability, and cost. For example, quartz (fused silica) is ideal for UV-Vis and fluorescence spectroscopy (190-2500 nm) due to its UV transparency and chemical resistance, borosilicate glass (300-2500 nm) is cost-effective for visible light applications, plastic cuvettes (polystyrene/PMMA, 380-780 nm) are disposable and affordable for visible-range analyses, and sapphire (150-5500 nm) offers exceptional durability and broad spectral range. Thus, the cuvettes (40f, 50f) are made from a material or composite material that possesses the optical transparency required for the specific wavelength or wavelength ranges of interest. As shown in FIGS. 5-8, the design of the cuvette holders (40, 50) includes a top opening (40c, 50d) to facilitate the placement and removal of the cuvettes (40f, 50f). In addition, a side opening (40d, 50d) is strategically provided to receive an LED for illuminating the cuvette holders (40, 50) in situations where only a single illumination source having a specific wavelength is needed, or to function as a reflecting spectrometer when an inner reflective background surface 40e is provided (FIG. 16).

The dispersed illumination exiting from the output port (10c) of the illumination integrating sphere 10 proceeds towards the sample integrating sphere 20 and the reference integrating sphere 30, where it enters through the input ports (20a, 30a) and is further conditioned by the inner reflective surfaces (20b, 30b) of the respective integrating spheres (20, 20). A sample integrating sphere 20 is essential for evenly distributing and scattering the radiant energy that traverses through the sample-containing cuvette 40f positioned within the sample cuvette holder 40 before the radiant energy exits the sample integrating sphere 20 via the output slit 20c. Conversely, the reference integrating sphere 30 is essential for evenly distributing and scattering the radiant energy that traverses through the empty reference cuvette 50f positioned within the reference cuvette holder 50 before the radiant energy exits the reference integrating sphere 30 via the output slit 30c.

According to an embodiment of the invention, the illumination integrating sphere 10, the reference integrating sphere 30, the sample integrating sphere 20, the reference cuvette holder 50, and the sample cuvette holder 40 are all integrally formed as a single unit, providing a compact and robust construction for ensuring consistent alignment and reducing variability in optical measurements. The integral formation of these components enhances stability and minimizes the risks associated with repeated assembly and disassembly that could introduce errors. It also simplifies the system setup and maintenance procedures.

Figure 9:
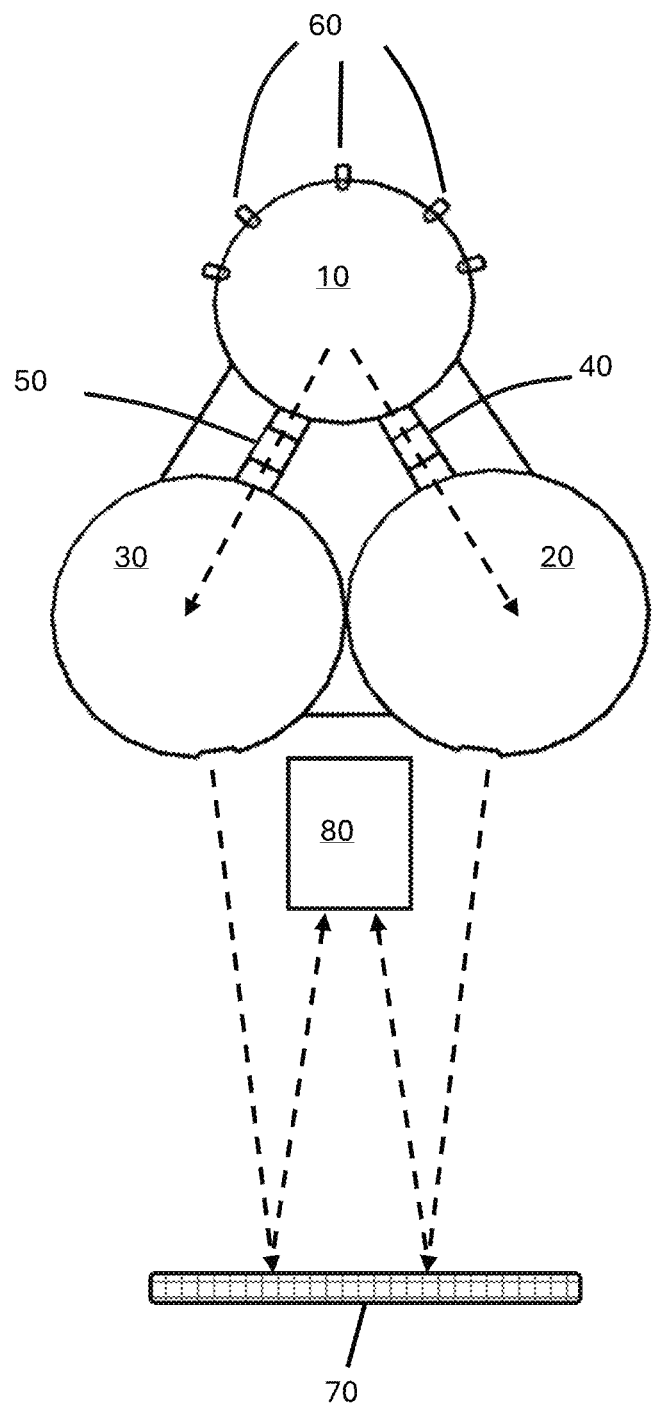
FIG. 9 illustrates the spectroscopic system including a diffraction gradient and an imaging capture device, according to the invention.

As shown in FIG. 9, the light exiting the sample integrating sphere 20 via the output slit 20c and the reference integrating sphere 30 via the output slit 30c is directed to a diffraction grating 70 provided to spread incoming radiation from the integrating spheres (20, 30) into its basic spectral elements, thus facilitating the process of spectral examination. Strategically situated along the optical path after the empty reference cuvette holder 50 and the sample cuvette holder 40, the diffraction grating 70 ensures that electromagnetic energy traversing through the reference and sample cuvettes (50, 40) is disaggregated into a spectrum. Such distribution aids in the accurate determination of spectral properties by permitting an imaging capture device 80 to capture and digitize the spectra to further evaluate the intensity of varying wavelengths. The specific alignment and design of the diffraction grating 70 are fine-tuned to maximize both efficiency and resolution during spectroscopic assessment, significantly contributing to the precise and dependable functioning of the system across various applications. When arranged after both integrating spheres, the diffraction grating facilitates concurrent or consecutive spectral examination of both the sample and reference light beams. This arrangement permits direct correlations to be established, compensating for any fluctuations in the illumination source or ambient factors, thus guaranteeing more precise and dependable outcomes. The width of the output slits significantly influences subsequent optical elements as well. The diffraction grating 70, which functions to segregate incoming illumination into its component spectra or hues, receives beams that have been refined by the output slits (20c, 30c) of the sample and reference integrating spheres (20, 30). As a result, the precision and exactness of spectral separation are closely affected by the adjustments of the slits height and width. When appropriately aligned, these variable slits guarantee that the beams are directed towards the imaging capture device 80.

The dispersed wavelengths diffracted from the diffraction grating 70 are then projected onto the imaging capture device 80, which is configured to detect and digitize the spectral data. This imaging capture device 80 could be a charge-coupled device (CCD) or a complementary metal-oxide-semiconductor (CMOS) sensor array, among possible alternatives, capable of converting incident photon energy into an electronic signal. This device is designed to identify and transform the diffracted beams into electronic impulses indicative of varying intensity values for each spectral component. These intensity values harbor essential data regarding the characteristics and quantities of assorted components within the sample 40g. Functioning as an advanced photographic apparatus, the imaging capture apparatus 80 comprises a two-dimensional matrix of photo-receptive units, each transforming received photons into electrical impulses. These impulses are subsequently processed by an analog-to-digital conversion module contained within the device, yielding a digital depiction of the brightness of each wavelength. After acquisition, these digitized spectral images hold significant information regarding the sample material. For instance, distinct points in the spectrum, such as a peak of a spectra 700 can be associated with green paint (FIG. 14), or peaks of spectrum 710, 720 that are specific to fluorescent green paint (FIG. 15), can signal particular material characteristics or constituents.

Figure 10:
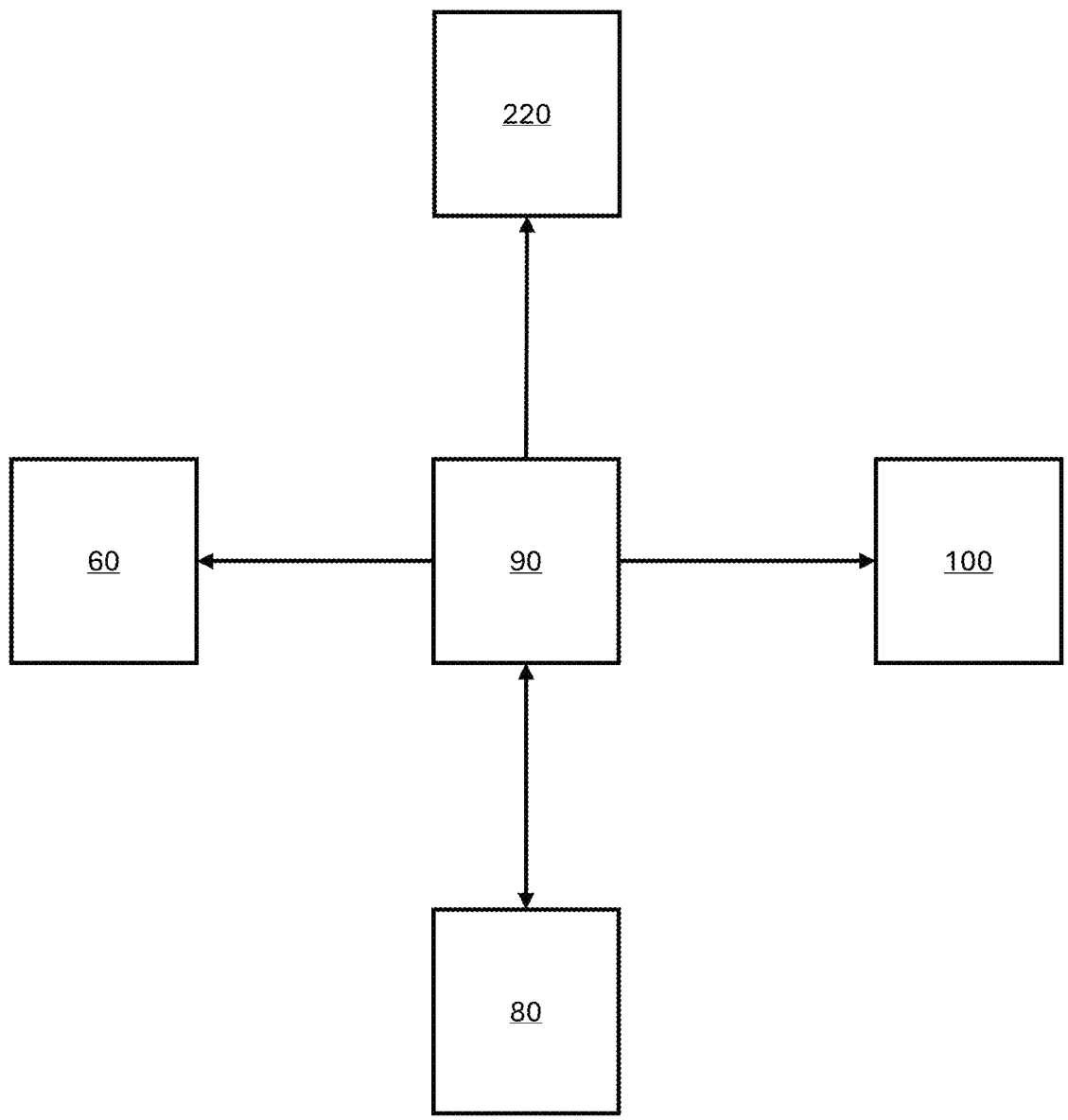
FIG. 10 is a block diagram illustrating the connections and control between the processor, the illumination sources, the imaging capture device, and a display device according to the invention.

As part of the spectroscopic system of the invention, a processor 90 is provided to control the functioning and operation of the system as shown in FIG. 10. The processor 90 is electrically coupled to the plurality of LEDs to control the wavelength of the LEDs, their luminance, brightness and/or frequency spectrum of the illumination source 60 to create a desired illumination profile. Such precision adjustment plays a pivotal role as it dictates the finesse and selectivity of the photons emitted by the source as they interact with the sample 40g, which in turn impacts the precision and pertinence of the spectral information gathered. In addition, the processor 90 is configured to activate and deactivate the illumination source 60. This capability enables initiating and halting the emission of illumination, which is essential for preserving power when the system is not in active use for examining specimens, thus enhancing the system's performance efficiency.

The processor 90 is also coupled to the imaging capture device 80 to oversee the capture process executed by the imaging capture device 80 and to receive the electronic signals representing detected spectral data from the imaging capture device 80. Precise timing and synchronization are essential during this phase to ensure that only relevant spectral data is recorded post-interaction with the sample or reference beams diffracted from the diffraction grating 70. The processor 90 is configured with algorithms capable of analyzing spectral patterns to identify materials, assess concentrations, and deduce other significant characteristics of the analyzed sample based on its unique spectral signature. The imaging capture device 80 serves as an essential element of the spectroscopic analysis system by capturing and digitizing the modulated illumination that has passed through both the sample cuvette and the reference cuvette for its subsequent analysis by the processor 90 to ascertain quantitative analytical results. These findings are eventually exhibited on a display device 100 under instructions from the processor 90, thus providing visual feedback for user interpretation and prompt analysis of the spectroscopic findings.

The display device 100, functions as the conduit for presenting data retrieved and analyzed by the spectroscopic system. It displays spectral measurements, analytical outcomes, and operational statuses of the system to the user. The display device 100 generally constitutes an electronic display capable of exhibiting graphical depictions of spectra, numerical indicators, or interactive elements that enable user engagement with the spectroscopic system. Its configuration can vary from basic LED or LCD indicators to more elaborate touchscreen controls, reflective of the complexity and specific application of the spectroscopic system. The display device 100 maintains an electronic connection to the processor 90, which decodes the signals emanating from the imaging capture device 80, and after analysis by the processor 90, data is conveyed to the display deice 100, where results can be visualized in various formats such as spectra graphs or numerical readings. A user can then interpret these results or make further informed adjustments to the slit width settings to refine subsequent analyses.

The height and width of the output slits (20c, 30c) can also be automatically adjusted under control of the processor 90 prior to the commencement of measurements or dynamically throughout the data acquisition process. The processor can alter the slit widths dynamically in response to feedback from the imaging capture device 80 or based on predefined spectral resolution requirements that depend on the application or the sample being analyzed. Specifically, the adjustable slit 200 can be controlled by the processor 90, which can automate movement of the adjustable panes to adjust the slit height and width based on different parameters. For example, the processor 90 can receive input from a user interface such as a touchscreen, keyboard, buttons, or a remote control. Additionally, pre-programmed settings can be established and stored on memory to adjust the slit height and width dynamically based on specific operational needs. The integration of optical or position sensors can further refine the system by allowing real-time feedback and automatic adjustments to maintain the desired slit height and width.

In one aspect of the invention, a non-transitory computer readable storage medium is provided to store at least one program for controlling the spectroscopic system configured for execution by at least one processor 90 of a computer system.

In one embodiment, the at least one program includes instructions for: activating and deactivating the at least one illumination source; adjusting at least one of an intensity or a wavelength of said at least one illumination source; adjusting a height and/or a width of the output slits of the reference integrating sphere and the sample integrating sphere; controlling a capture process of said imaging capture device; processing said digital spectral images; or displaying the processed digital spectral image on a display.

Embodiments of the present invention may be implemented in hardware, firmware, software, or any combination thereof. Embodiments of the present invention may also be implemented as instructions stored on a machine-readable medium. These are readable and executable by one or more processors 90. A machine-readable medium includes any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it acknowledged that such descriptions are merely for convenience. Such actions in fact result from computing devices, processors, controllers, or other devices executing the firmware, software, routines, instructions, etc. The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this specification, a computer readable storage medium may be any non-transitory, tangible medium that can contain, or store a program for use by or in connection with an instruction execution system, apparatus, or device. Storage and services may be integrally included with the hyperspectral imaging system or remote such as in the "cloud".

It is also envisioned that the at least one processor 90, the at least one memory/computer readable storage medium or both can be integrated into the hyperspectral imaging device. Alternatively, the at least one processor 90, the at least one memory/computer readable storage medium or both can be provided on a separate computing station, such as but not limited to, a computer desktop, a laptop, tablet or a smartphone. As is well understood in the art, additional components, such as but not limited to, input/output peripherals, audio/video cards, power supplies, wireless and wired network cards, can also be provided or required in conjunction with the at least one processor 90 and the at least one computer readable storage medium to perform the steps, acts or operations of the present invention.

According to an embodiment of the invention, all the steps, acts or operations are performed using the same processor 90 and the same memory/computer readable storage medium. In another embodiment, some of the steps, acts or operations are performed using one processor 90 while other steps, acts or operations are performed using a different processor 90. For example, one processor 90 can execute the instructions to perform the steps, acts or operations of activating and deactivating the at least one illumination source while a different processor 90 can execute the instructions to perform the steps, acts or operations of processing the digital spectral images. In addition, it is also envisioned that instructions for performing some of the steps, acts or operations are stored in one computer-readable storage medium and instructions for performing other steps, acts or operations are stored in another computer-readable storage medium. For example, one computer-readable storage medium can store instructions that when executed by a processor performs the steps, acts or operations of activating and deactivating the at least one illumination source and another computer-readable storage medium can store instructions that when executed by a processor performs the steps, acts or operations of processing the digital spectral images.

The processor 90 is also configured to process the spectral data received to generate intrinsic spectra of the sample 40g. According to an embodiment of the invention, the processor 90 determines the intensity differences between a first set of illumination spectrum from said reference cuvette and the illumination spectrum from the sample cuvette. Then a second set of spectra from the reference cuvette and the sample cuvette is obtained by the processor 90, wherein the spectrum from the reference cuvette contains only illumination spectral components and the spectrum from the sample cuvette contains both illumination and sample spectral components when illumination energy is provided simultaneously to said reference and sample cuvettes. The processor 90 further adjusts the intensities of the illumination spectrum from said reference cuvette of the second set of spectra by subtracting or adding the previously determined intensity difference at each corresponding wavelength to the intensities of said illumination spectrum wavelength from said reference cuvette of the second set of spectra to make the illumination intensities from said cuvettes equal across the illumination wavelength range; and subtracts the adjusted illumination spectrum of said second set of spectra from the spectrum from the sample cuvette of the second set of spectra that contains both illumination and sample components, effectively removing the spectral component of illumination energy from a sample spectrum. The processor 90 can implement and modify the intrinsic methodology described in U.S. Pat. No. 9,435,687 to Schwartz et al, incorporated herein by reference in its entirety. Before sample data is processed, the spectroscopic system of the invention must be Zeroed such that the system does not register any spectral components when the reference and sample cuvettes are empty. This is accomplished by subtracting the empty reference spectrum from the empty sample spectrum to produce a Residual spectrum. The Residual spectrum is added back to the reference spectrum and this combination is subtracted from the sample spectrum producing a Zero Order Spectrum across the entire range of the illumination as illustrated by the straight horizontal line shown in FIGS. 14 and 15. This validates that no spectral components are obtained from the empty cuvettes.

Figure 17:
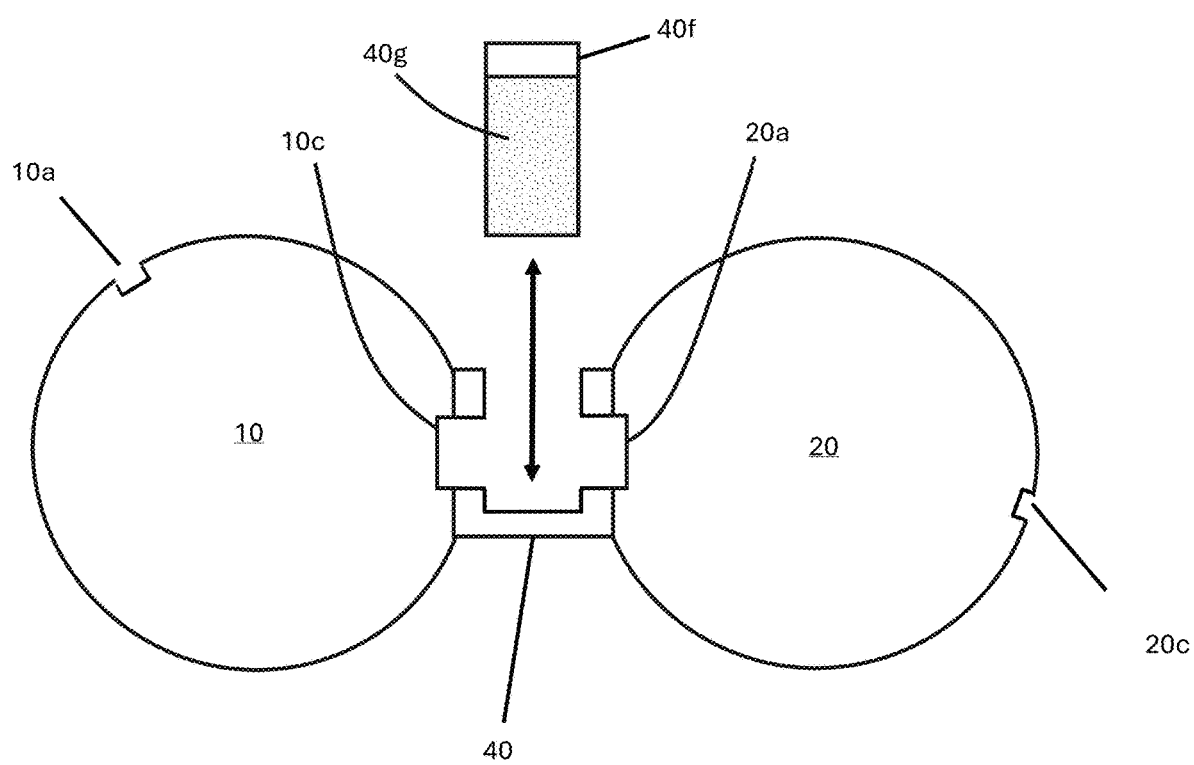
FIG. 17 shows a cross sectional view of an integrating sphere, the sample cuvette holder, and the sample integrating sphere, where the sample cuvette is outside the sample cuvette holder, according to the invention.
Figure 18:
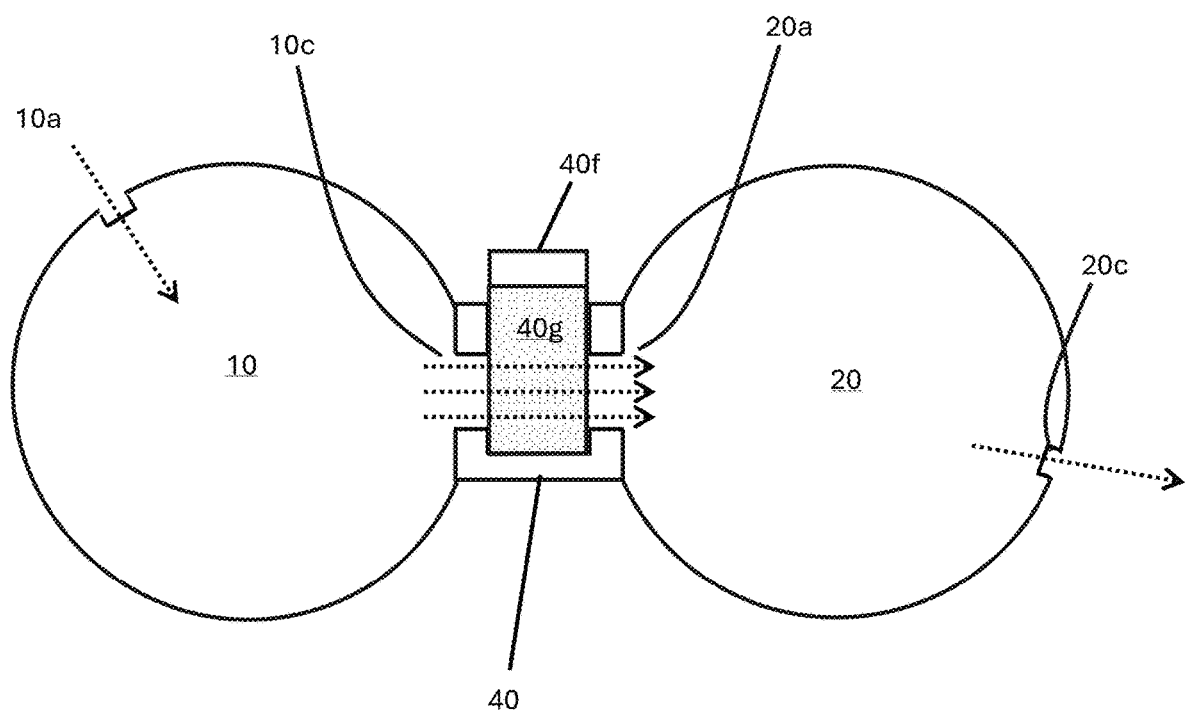
FIG. 18 shows a cross sectional view of an integrating sphere, the sample cuvette holder, and the sample integrating sphere, where the sample cuvette is inside the sample cuvette holder, according to the invention.

According to a preferred embodiment of the invention. the plurality of LEDs are controlled by the processor 90 to generate a desire illumination profile. Light emitted from the LEDs is reflected within the illumination integrating sphere 10 to generate homogenized illumination departing the integrating sphere through output ports 10c, which then direct the homogenized illumination towards the reference and sample cuvette holders (50, 40) containing their respective reference and sample cuvettes (50f, 40f). These can be manually placed or removed by a user or automatically by a mechanical mechanism such as a robot arm that can also be controlled by the processor 90. FIGS. 17 and 18 illustrate how the sample cuvette 40f is placed and removed from the sample cuvette holder 40. Specifically, the sample cuvette 40f is inserted into the sample cuvette holder 40 through the top opening 40c, so that the homogenized light exiting the output port 10c of the illumination integrating sphere 10 traverses the sample 40g and enters the sample integrating sphere 20 via its input port 20a where the resulting homogenized light exiting the output slit 20c is directed to the diffracting grating 70. While the explanation of FIGS. 17 and 18 is directed to the placement and removal of the sample cuvette 40f within the sample cuvette holder 40, it should be understood that the same procedure applies to the placement and removal of the reference cuvette 50f within the reference cuvette holder 50. If the reference and the sample integrating spheres (30, 20) are provided with an adjustable slit 200, the height and width of their output slits can also be adjusted as previously explained by the processor 90.

Afterwards, the homogenized lights exit the reference and sample integrating spheres (30, 20) through respective output slits (30, 20c) onto the diffraction grating 70, which in turn diffracts the received light onto the imaging capture device 80. As previously explained, the processor 90 controls the imaging capture device 80 to oversee the capture process executed by the imaging capture device 80 and to receive the electronic signals representing detected spectral data from the imaging capture device 80 for further processing, analysis and/or display to a user.

Figure 11:
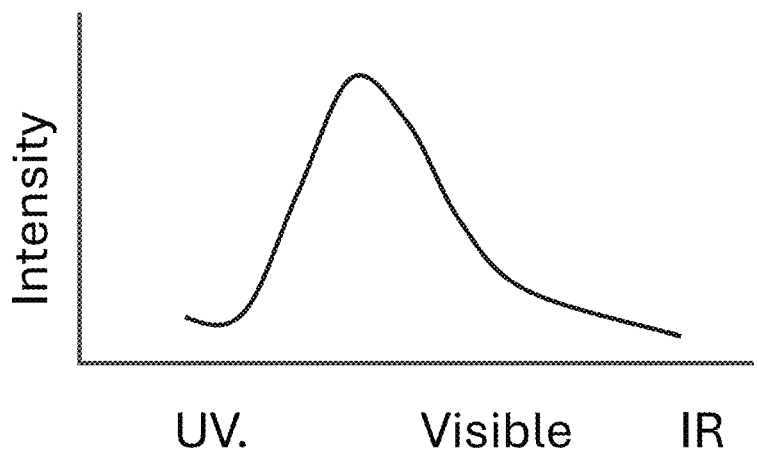
FIG. 11 is a graph showing Illumination spectra of white LED, according to the invention.
Figure 12:
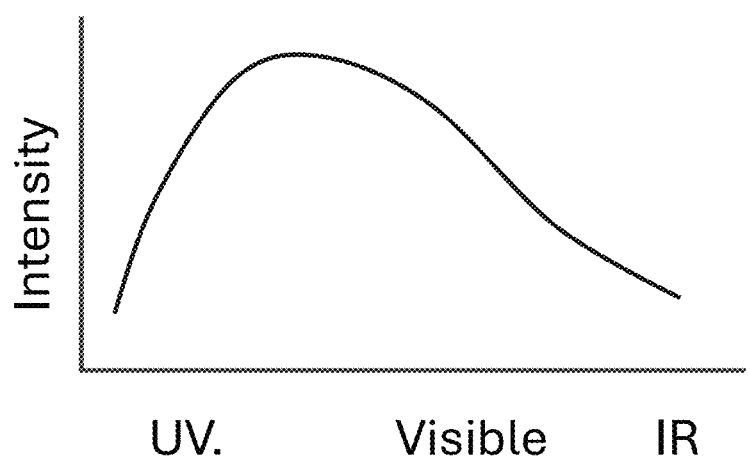
FIG. 12 is a graph showing Illumination spectra profile of white LED broadened by the addition of light from blue and red LEDs, according to the invention.
Figure 13:
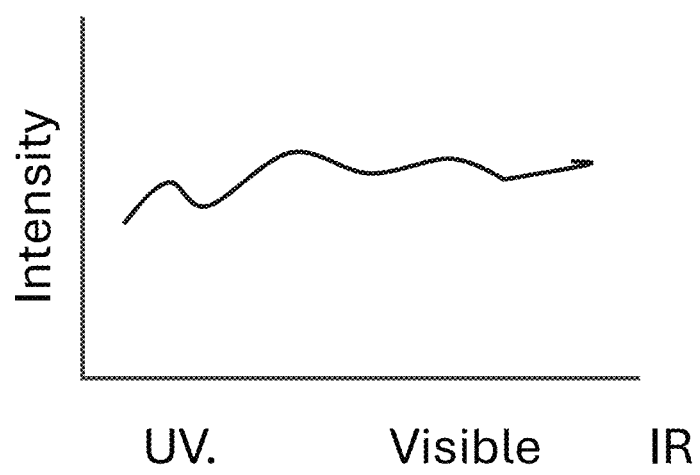
FIG. 13 is a graph showing Illumination spectra profile of white LED of FIG. 12, further broadened by the addition of light from UV and IR LEDs, according to the invention.
Figure 14:
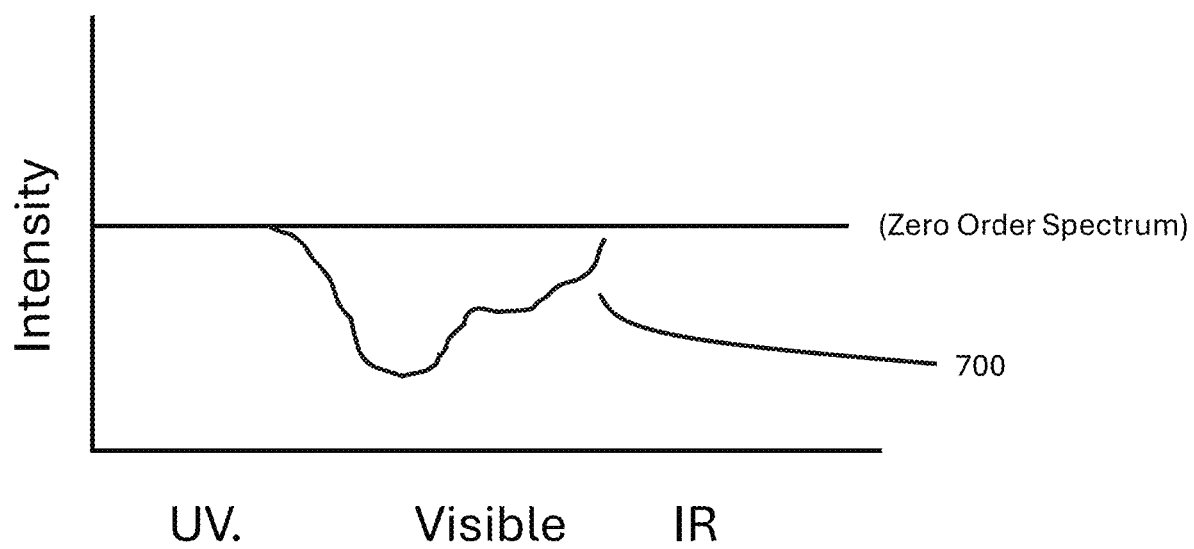
FIG. 14 shows intrinsic spectra from green paint, according to the invention.
Figure 15:
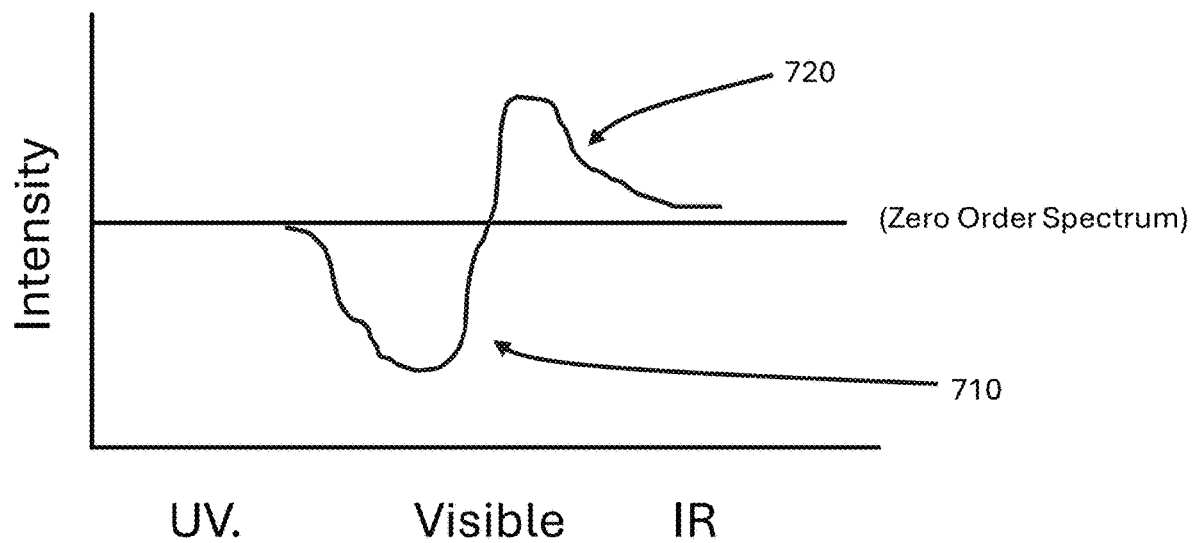
FIG. 15 shows intrinsic spectra from green fluorescent paint, where the emission peak of the green fluorescent paint is above the Zero Order Spectrum.

FIG. 11 illustrates a graph showing intensity versus wavelength of Illumination spectra of a white LED within the UV-IR regions. However, as previously explained, the plural LEDs of the illumination source 60 can be controlled to create and/or modify illumination profiles. For example, the illumination spectra profile of the white LED shown in FIG. 11 can be broadened by the addition of light from blue and red LEDs, as illustrated by FIG. 12 and can be further broadened by the addition of light from UV and IR LEDs, as illustrated by FIG. 13.

Figure 19:
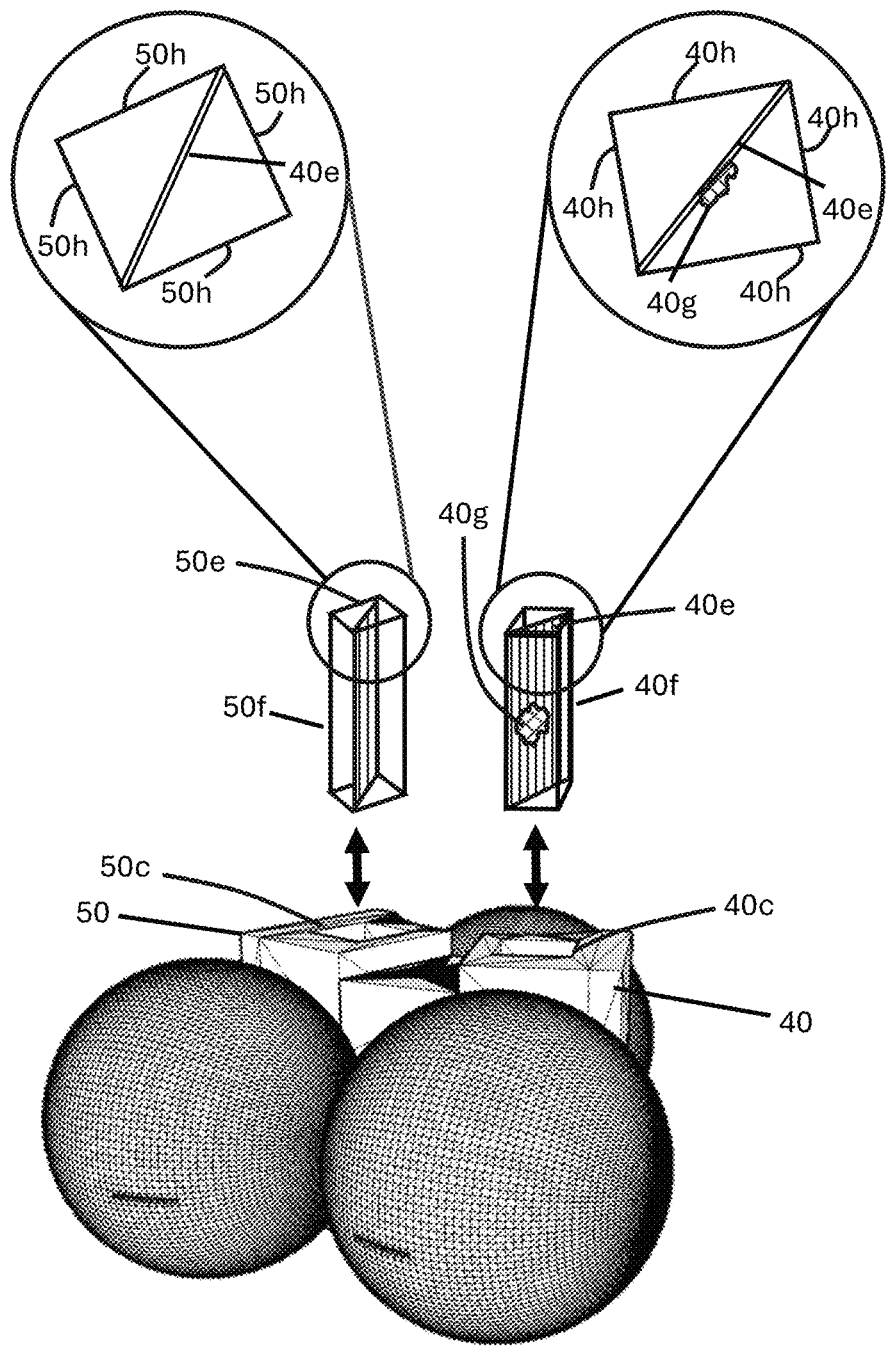
FIG. 19 shows an embodiment of a spectroscopic system used on the reflective mode according to the invention.
Figure 20:
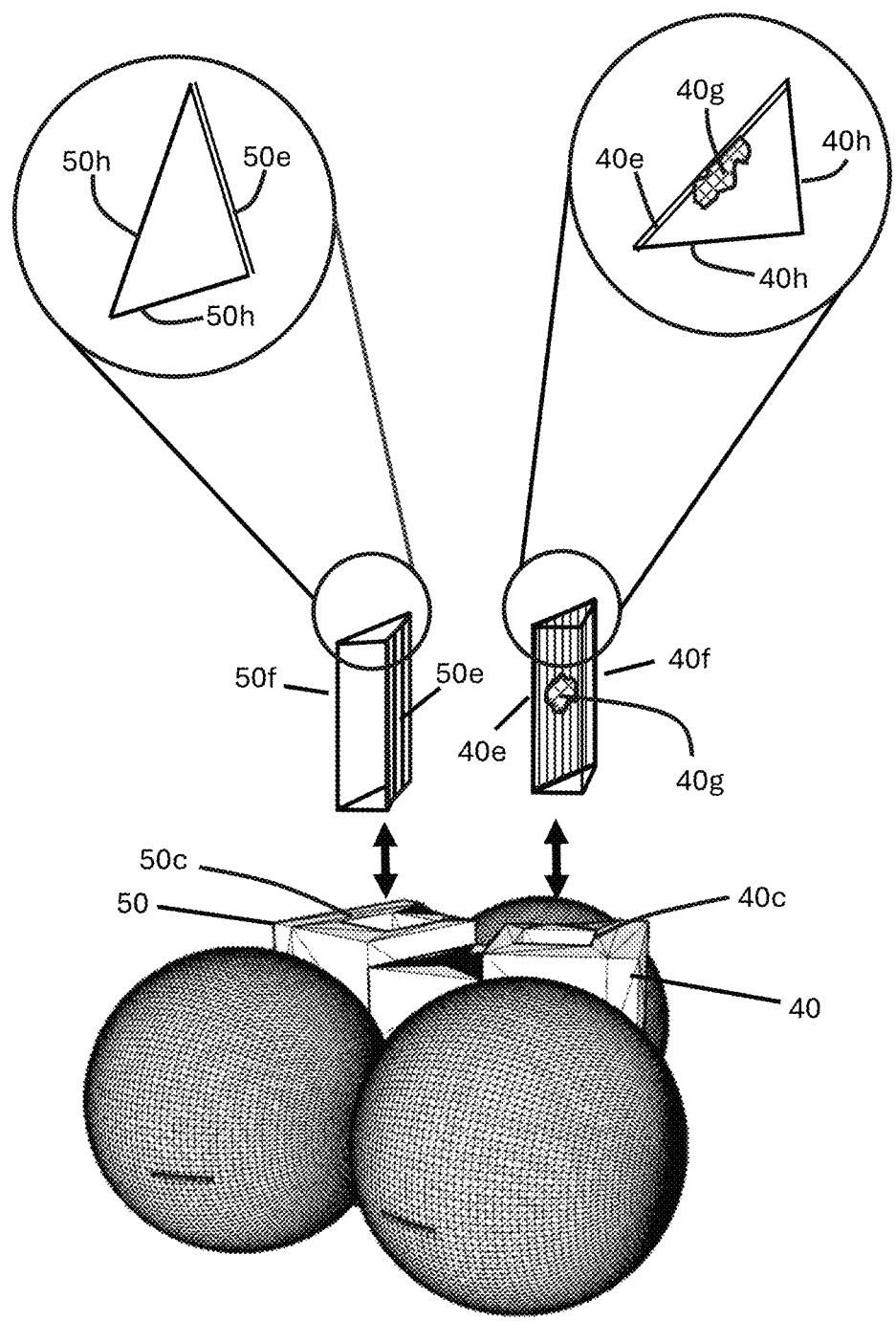
FIG. 20 shows another embodiment of a spectroscopic system used on the reflective mode according to the invention.

The spectroscopic system of the invention can also be used as a reflective spectrometer. According to the invention, the reflective mode function can be implemented in various forms. For example. an inner reflective background surface (40e, 50e) can be provided within the cuvettes (40f, 50f) longitudinally extending along the height of the cuvettes and oriented at an angle in relation to the side opening (40d, 50d) and the input ports (20a, 30a) of the integrating spheres (20, 30). As shown in FIG. 19, each cuvette has four transparent walls (40h, 50h) and the inner reflective background surface (40e, 50e) diagonally position within the cuvettes (40f, 50f). Alternatively, the inner reflective background surface (40e, 50e) can be formed as a wall of the cuvettes (40f, 50f) which is oriented at an angle in relation to the side opening (40d, 50d) and the input ports (20a, 30a) of the integrating spheres (20, 30). According to one preferred embodiment of this implementation, the cuvettes (40f, 50f) will be provided as half cuvettes having a triangular shape with two transparent walls (40h, 50h) and a third reflective wall (40e, 50e) that serves as the inner reflective background surface where the illumination coming from the side ports (40d, 50d) of the cuvette holders (40, 50) will be reflected into the sample and reference integrating spheres (20, 30), as shown in FIG. 20. Regardless of the configuration, the cuvettes should be snugly housed within the cuvette holders to ensure optimal interaction with the illuminating source.

As shown in FIG. 16, the illumination source 60 is provided on the side opening 40d of the sample cuvette holder 40 to emit light aimed at the sample cuvette 40f, where the light from the illumination source 60 engages with the sample 40g contained within the sample cuvette 40f. The inner reflective background surface 40e is diagonally positioned so that light traversing through the sample is evenly dispersed and reflected into the input port 20a of the sample integrating sphere 20. The inner reflective background surface 40e is aligned at a specific angle in relation to the at least one side opening. This arrangement is of practical significance since it guarantees that illumination emitted from the lateral illumination source 60 strikes the surface and is deflected suitably into the adjoining integrating spheres (i.e., the reference integrating sphere 30 and the sample integrating sphere 20). As previously explained, the internal reflective background surface 40e can be positioned within the cuvette holders (40, 50), within each cuvette (40f, 50f), or combination of both placements. While the explanation of FIG. 16 is directed to the arrangement on the sample integrating sphere 20, it should be understood that the same arrangement is provided on the reference integrating sphere 30.

The following examples are provided as non-limiting embodiments of the spectroscopic system of the invention.

Example 1

An integrated optical system was designed that incorporated a 50 mm illumination integrating sphere affixed with LEDs of selected wavelength mounted through the wall of the sphere. Two optical tunnels connected to the integrating sphere were designed to serve as the reference and sample cuvette holders to hold 10×10 mm square cuvettes. Each optical tunnel (cuvette holder) directed the spectral beams into separate 50 mm reference and sample integrating spheres. The spectral energies from both integrating spheres were then directed through fixed or adjustable slits onto a diffraction grating, as illustrated in FIG. 9.

Example 2

The integrated optical design of Example 1 was 3D printed using 0.175 mm white polylactic acid on an Anycubic Kobra 2 Max printer. The integrated optical system was printed as a single unit where a single illumination integrating sphere was attached to both the reference and sample cuvette holders that serve as light tunnels to direct light into the reference and sample integrating spheres. The 50 mm integrating spheres were printed with a wall thickness of 2 mm. The reference and sample integrating spheres were each printed with an 1×10 mm horizontal slit directed at a reflective diffraction grating. A white wavelength LED for visible spectroscopy and a blue LED for fluorescence spectroscopy were mounted through the wall of the illumination integrating sphere. To keep the illumination from radiating out of the optical system, the whole unit was first sprayed with reflective chromium paint, then followed by several coats of flat black paint.

Example 3

The illumination source in the integrated optical system of Example 1 was modified by mounting white, UV, red, green, blue, and IR LEDs through the walls of the illumination integrating sphere. By selectively turning on the individual LED's and adjusting their intensities, the output energy of the selected LEDs were combined resulting in specific custom illumination profiles. Some of these illumination profiles are illustrated in FIGS. 11-13.

Example 4

The integrated optical system was incorporated into the configuration of an Intrinsic Spectrometer where the output of the reference and sample integrating spheres was directed onto a diffraction grating which in turn was imaged by a digital camera controlled by a Raspberry Pi 4B computer that analyzed and processed the received spectra to generate and display intrinsic spectra of the sample.

Example 5

The Intrinsic Spectrometer was modified by adding a reflection mode for use with solid samples. This modification was achieved by adding an illumination port on the sides of the reference and sample cuvette holders, illustrated in FIG. 5. A strip of background material as positioned across the diagonal of each cuvette or cuvette holder such that the surface of the strip provides a reflecting condition that directs the illumination energy onto the background material and reflects the energy at a 90 degree down the optical tunnels (cuvette holders) attached to the reference and sample integrating spheres. By placing a material of interest on the reflective sample background, spectra from the material and the reflective reference background strip enter the sample integrating sphere, whereas only spectra from the background strip will enter the reference integrating sphere.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A spectroscopic device comprising:
   an illumination chamber having at least one illumination source mounted on a surface thereof, a reference output port and a sample output port, wherein said illumination chamber is configured to homogenize light received from said at least one illumination source and to provide homogenized output light to said reference output port and said sample output port;
   a reference cuvette holder configured to receive an empty reference cuvette and being optically coupled to said reference output port;
   a sample cuvette holder configured to receive a sample cuvette and being optically coupled to said sample output port;
   a reference chamber optically coupled to the reference cuvette holder so that said reference cuvette holder is positioned between said illumination chamber and said reference chamber, and being configured to homogenize light transmitted through said reference cuvette holder and provide a homogenized output light via a reference output slit; and
   a sample chamber optically coupled to the sample cuvette holder so that said sample cuvette holder is positioned between said illumination chamber and said sample chamber, and being configured to homogenize light transmitted through said sample cuvette holder and provide a homogenized output light via a sample output slit, wherein digital spectral images of the output light from the reference chamber and the output light from the sample chamber are generated and further processed by at least one processor to effectively remove a spectral component of illumination energy of said at least one illumination source from a sample spectrum of a sample provided on said sample cuvette.

2. The spectroscopic device according to claim 1, wherein said sample cuvette holder and said reference cuvette holder comprise a top opening configured to receive said sample cuvette and said reference cuvette, respectively.

3. The spectroscopic device according to claim 2, wherein each of said reference cuvette holder and said sample cuvette holder comprises at least one side port configured to receive at least one side illumination source, said at least one side port being provided on a side of said cuvette holders, separate from the respective output ports.

4. The spectroscopic device according to claim 1, wherein said sample cuvette contains a liquid sample or a solid sample.

5. The spectroscopic device according to claim 1, wherein said illumination chamber, said reference chamber, and said sample chamber comprise integrating spheres.

6. The spectroscopic device according to claim 3, further comprising an inner reflective background surface provided inside each said reference cuvette and said sample cuvette, as a wall of said reference and sample cuvettes, or combinations thereof.

7. A spectroscopic device comprising:
   an illumination chamber having at least one illumination source mounted on a surface thereof, a reference output port and a sample output port, wherein said illumination chamber is configured to homogenize light received from said at least one illumination source and to provide homogenized output light to said reference output port and said sample output port;
   a reference cuvette holder having a top opening configured to receive an empty reference cuvette and being optically coupled to said reference output port;
   a sample cuvette holder having a top opening configured to receive a sample cuvette and being optically coupled to said sample output port, wherein each of said reference cuvette holder and said sample cuvette holder comprises at least one side port configured to receive at least one side illumination source, said at least one side port being provided on a side of said cuvette holders, separate from the respective output ports;
   a reference chamber optically coupled to the reference cuvette holder, and being configured to homogenize light transmitted through said reference cuvette holder and provide a homogenized output light via a reference output slit; and
   a sample chamber optically coupled to the sample cuvette holder, and being configured to homogenize light transmitted through said sample cuvette holder and provide a homogenized output light via a sample output slit; and an inner reflective background surface provided inside each said reference cuvette and said sample cuvette, as a wall of said reference and sample cuvettes, or combinations thereof, wherein said inner reflective background surface is positioned at an angle with respect to said at least one side port so that light from said at least one side illumination source is reflected by said inner reflective background surface into said reference chamber and said sample chamber, respectively.

8. The spectroscopic device according to claim 1, wherein said illumination chamber, said reference chamber, and said sample chamber comprise an inner reflective surface.

9. The spectroscopic device according to claim 1, wherein said at least one illumination source comprises a plurality of illumination sources, each illumination source emitting light at a different wavelength range.

10. The spectroscopic device according to claim 1, wherein said illumination chamber, said reference chamber, said sample chamber, said reference cuvette holder, and said sample cuvette holder are integrally formed as a single unit.

11. The spectroscopic device according to claim 1, wherein said at least one illumination source comprises a plurality of LEDS.

12. The spectroscopic device according to claim 1, wherein said at least one illumination source comprises an LED.

13. The spectroscopic device according to claim 3, wherein said at least one side illumination source comprises an LED.

14. The spectroscopic device according to claim 12, wherein said LED comprises a white, UV, blue, green, red, or IR LED.

15. The spectroscopic device according to claim 13, wherein said LED comprises white, UV, blue, green, red, or IR LED.

16. The spectroscopic device according to claim 11, wherein at least one of a wavelength of said plurality of LEDs, an intensity of said plurality of LEDs, or a spatial arrangement of said plurality of LEDs over a surface of the illumination chamber is selected so that the homogenized output light exiting said reference output port and said sample output port has a desired illumination profile.

17. The spectroscopic device according to claim 1, wherein at least one of a height or a width of the output slits of said reference chamber and said sample chamber is adjustable.

18. The spectroscopic device according to claim 9, wherein said plurality of illumination sources is controlled so that the homogenized output light of said illumination chamber has a wavelength range corresponding to a combination of a wavelength range of each illumination source of said plurality of illumination sources.

19. The spectroscopic device according to claim 1, further comprising a diffraction grating configured to receive and diffract the homogenized output light exiting the output slits of the reference and sample chambers.

20. The spectroscopic device according to claim 19, further comprising an imaging capture device configured to capture said digital spectral images of the homogenized output light diffracted by said diffraction grating.

21. The spectroscopic device according to claim 20, wherein a spectral resolution of said digital spectral images is controlled by adjusting a height of the output slits of said reference chamber and said sample chamber.

22. The spectroscopic device according to claim 1, wherein the output slits of the reference chamber and the sample chamber comprise an adjustable slit including adjustable panes, and an adjust mechanism coupled to said adjustable panes to control a separation height and width between said adjustable panes.

23. The spectroscopic device according to claim 22, wherein said adjust mechanism is configured to be operated manually by a user or automatically.

24. The spectroscopic device according to claim 20, further comprising at least one memory storing instructions that when executed by the at least one processor, cause the at least one processor to perform operations comprising at least one of:

activating and deactivating the at least one illumination source;

adjusting at least one of an intensity or a wavelength of said at least one illumination source;

adjusting at least one of a height or a width of the output slits of the reference chamber and the sample chamber;

controlling a capture process of said imaging capture device;

processing said digital spectral images; or displaying the processed digital spectral image on a display.

25. A spectroscopic system comprising:

an illumination chamber having at least one illumination source mounted on a surface thereof, a reference output port and a sample output port, wherein said illumination chamber is configured to homogenize light received from said at least one illumination source and to provide homogenized output light to said reference output port and said sample output port;

a reference cuvette holder configured to receive an empty reference cuvette and being optically coupled to said reference output port;

a sample cuvette holder configured to receive a sample cuvette and being optically coupled to said sample output port;

a reference chamber optically coupled to the reference cuvette holder, and being configured to homogenize light transmitted through said reference cuvette holder and provide a homogenized output light via a reference output slit; and a sample chamber optically coupled to the sample cuvette holder, and being configured to homogenize light transmitted through said sample cuvette holder and provide a homogenized output light via a sample output slit;

a diffraction grating configured to receive and diffract the homogenized output light exiting the output slits of the reference and sample chambers;

an imaging capture device configured to capture digital spectral images of the homogenized output light diffracted by said diffraction grating; and at least one processor; and at least one memory storing instructions that when executed by the at least one processor, cause the at least one processor to perform operations comprising:

obtaining from a reference cuvette and from an empty sample cuvette a first set of illumination spectra when illumination energy is provided to said reference and empty sample cuvettes;

determining intensity differences between the illumination spectrum from said reference cuvette and the illumination spectrum from said empty sample cuvette at each wavelength across an illumination wavelength range;

obtaining from said reference cuvette and said sample cuvette containing a sample, a second set of spectra wherein the spectrum from the reference cuvette contains only illumination spectral components and the spectrum from said sample cuvette contains both illumination and sample spectral components when illumination energy is provided simultaneously to said reference and sample cuvettes;

adjusting the intensities of the illumination spectrum from said reference cuvette of the second set of spectra across the wavelength range of the illumination by subtracting or adding the previously determined intensity difference at each corresponding wavelength to the intensities of said illumination spectrum wavelength from said reference cuvette of the second set of spectra to make the illumination intensities from said cuvettes equal across the illumination wavelength range; and subtracting the said adjusted illumination spectrum of the said second set of spectra from the spectrum from said sample cuvette of the second set of spectra that contains both illumination and sample components, effectively removing the spectral component of illumination energy from a sample spectrum.

* * * * *